United States Patent
Oelsner et al.

(10) Patent No.: US 11,684,884 B2
(45) Date of Patent: Jun. 27, 2023

(54) FILTER ELEMENT HAVING A CONDUCTIVE EDGE BAND AND FILTER ASSEMBLY HAVING SUCH A FILTER ELEMENT

(71) Applicant: Carl Freudenberg KG, Weinheim (DE)

(72) Inventors: Alexander Oelsner, Mannheim (DE); Gennaro De Angelis, Viernheim (DE); Ulrich Stahl, Laudenbach (DE); Peter Capuani, Waldmichelbach (DE); Oliver Staudenmayer, Weinheim (DE)

(73) Assignee: CARL FREUDENBERG KG, Weinheim (DE)

( * ) Notice: Subject to any disclaimer, the term of this patent is extended or adjusted under 35 U.S.C. 154(b) by 274 days.

(21) Appl. No.: 17/071,026

(22) Filed: Oct. 15, 2020

(65) Prior Publication Data

US 2021/0162331 A1 Jun. 3, 2021

(30) Foreign Application Priority Data

Nov. 28, 2019 (EP) .................................... 19212218

(51) Int. Cl.
*B01D 46/00* (2022.01)
*B01D 46/52* (2006.01)

(52) U.S. Cl.
CPC ....... *B01D 46/521* (2013.01); *B01D 46/0036* (2013.01); *B01D 2239/0241* (2013.01); *B01D 2253/102* (2013.01); *B01D 2265/04* (2013.01)

(58) Field of Classification Search
CPC .............. B01D 46/521; B01D 46/0036; B01D 2239/0241; B01D 2253/102; B01D 2265/04; B01D 46/52; B01D 46/00

USPC ........................................................ 55/521
See application file for complete search history.

(56) References Cited

U.S. PATENT DOCUMENTS

| | | | |
|---|---|---|---|
| 3,933,643 A | 1/1976 | Colvin | |
| 7,008,469 B2 | 3/2006 | Vetter | |
| 2008/0016832 A1* | 1/2008 | Krisko | B01D 46/525 55/342 |
| 2011/0048238 A1 | 3/2011 | Gatchell | |
| 2012/0175298 A1* | 7/2012 | Gupta | B01D 39/2065 210/496 |
| 2013/0068103 A1* | 3/2013 | Haefner | B01D 46/521 96/135 |

FOREIGN PATENT DOCUMENTS

| | | | |
|---|---|---|---|
| DE | 102010044258 A1 | 5/2011 | |
| DE | 202012011968 U1 * | 3/2013 | ......... B01D 46/0006 |
| DE | 102010044258 B4 * | 2/2014 | ............ B01D 46/10 |
| EP | 3333858 A1 | 6/2018 | |

* cited by examiner

*Primary Examiner* — Robert A Hopkins
*Assistant Examiner* — Qianping He
(74) *Attorney, Agent, or Firm* — Leydig, Voit & Mayer, Ltd.

(57) ABSTRACT

A filter element for filtration of an air stream includes: a folded filter medium forming a bellows, the filter medium being constructed at least in two layers and having a particle filter layer, an electrically conductive filter layer, and at least one edge band, the at least one edge band being connected to at least one outer side of the bellows. At least one further edge band is connected to an outer side of the bellows. The at least one further edge band is electrically conductive. The at least one further edge band forms a pocket open towards one side.

12 Claims, 4 Drawing Sheets

FILTER ELEMENT HAVING A CONDUCTIVE EDGE BAND AND FILTER ASSEMBLY HAVING SUCH A FILTER ELEMENT

CROSS-REFERENCE TO PRIOR APPLICATION

Priority is claimed to European Patent Application No. EP 19 212 218.2, filed on Nov. 28, 2019, the entire disclosure of which is hereby incorporated by reference herein.

FIELD

The invention relates to a filter element and a filter assembly.

BACKGROUND

Numerous solutions for filtration of fluid streams are known from the prior art. Pleated filter media are frequently used here. EP 3 333 858 A1 shows a filter element having a filter medium provided with folds, which is thus pleated and forms a bellows. The bellows is provided with an edge band on its lateral surfaces.

Furthermore, it is known to increase the filtration performance of filters by using units for ionizing particles in the air to be purified. To this end, ionization electrodes for ionization are arranged upstream of the filter. Deposition electrodes are applied directly to the bellows of the filter, for example by the use of metallic lattices or coatings. Such a filter assembly is illustrated and described, for example, in U.S. Pat. No. 7,008,469 B2.

The provision of electrically conductive wires or coatings on the bellows is elaborate and expensive. The area available for dust filtration may also be reduced.

It is further disadvantageous that installation space must be made available for the control electronics of the ionization electrodes in the air channel. Due to the usually restricted conditions in air ducts, maintenance or retrofitting is then possible only with difficulty.

SUMMARY

In an embodiment, the present invention provides a filter element for filtration of an air stream, comprising: a folded filter medium forming a bellows, the filter medium being constructed at least in two layers and having a particle filter layer, an electrically conductive filter layer, and at least one edge band, the at least one edge band being connected to at least one outer side of the bellows, wherein at least one further edge band is connected to an outer side of the bellows, wherein the at least one further edge band is electrically conductive, and wherein the at least one further edge band forms a pocket open towards one side.

BRIEF DESCRIPTION OF THE DRAWINGS

The present invention will be described in even greater detail below based on the exemplary figures. The invention is not limited to the exemplary embodiments. Other features and advantages of various embodiments of the present invention will become apparent by reading the following detailed description with reference to the attached drawings which illustrate the following.

DETAILED DESCRIPTION

Figure 1:
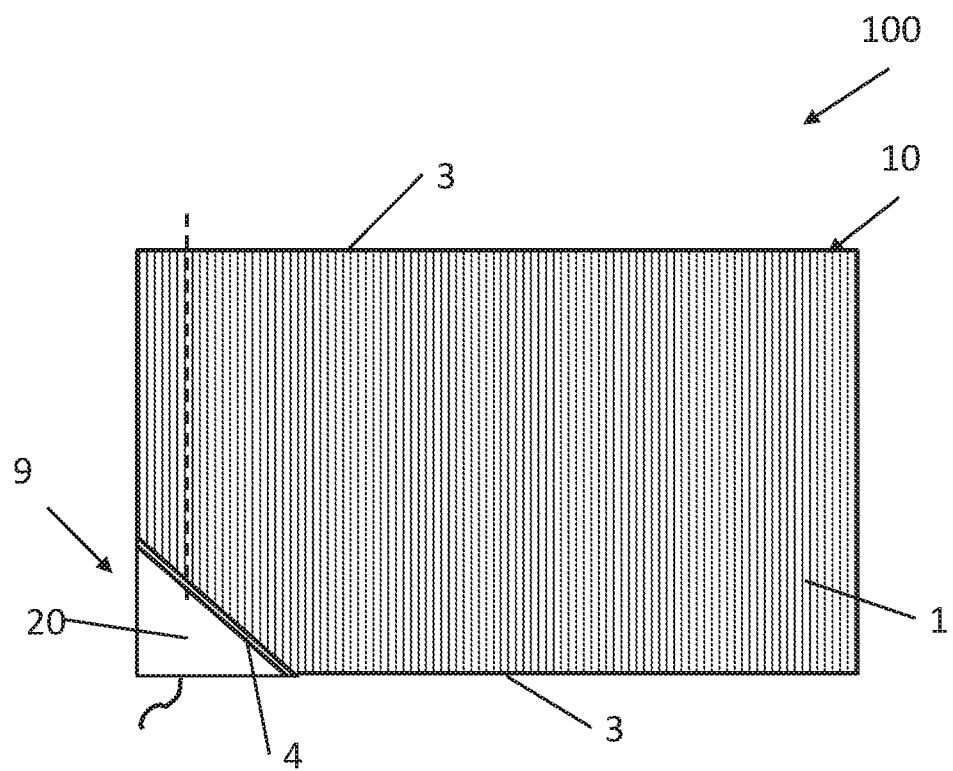
FIG. 1 shows a plan view of a first embodiment of a filter assembly according to invention.

In an embodiment, the present invention provides a filter element in which an electronic unit can easily be connected directly to the bellows of the filter element.

In an embodiment, the present invention provides a compact filter assembly which has an electronic unit.

According to the invention, it has been found to be advantageous to use an electrically conductive edge band:

The filter element according to the invention serves for filtration of a fluid stream. The filter element has a filter medium which forms a bellows and is provided with folds, in particular is pleated, wherein a plurality of folding edges and folding surfaces lying between the folding edges are formed. The bellows is provided, at least on a side surface that does not extend in the direction of the folds, with at least one edge band and is connected in a firmly bonded manner, namely in such a way that the at least one edge band abuts the end edges of folding surfaces. A preferred bond is effected through adhesive bonding. Alternative terms for "edge band" are also "side strips" or "edge strips" or "side portions." The edge strip is a strip or a sheet of a flat material.

The filter medium has at least two layers and has at least one particle filter layer and at least one electrically conductive filter layer, in particular an adsorption filter layer for gas adsorption. The particle filter layer can in particular be made of nonwoven fabric. Nonwoven fabric has the advantage that it is a light material with good filtration and production properties. Electrical conductivity of the filter layer does not mean that there must be as good a conductivity as, for example, with copper or other metals. In order to provide sufficient electrical conductivity of the filter layer, the bellows may have an electrical resistance in the range from 1 to 90 MOhms (1 to 90 megaohms, that is to say 1,000,000 to 90,000,000 Ohms).

According to the invention, at least one further edge strip is firmly bonded, in particular glued, to another outer side of the bellows in such a way that the at least one further edge strip abuts the end edges of folding surfaces. Therefore, this element is also referred to as edge band. The at least one further edge band is designed to be electrically conductive. Here as well, electrical conductivity does not mean that there must be as good a conductivity as in the case of copper or other metals. In order for there to be sufficient electrical conductivity of the at least one further edge band, the at least one further edge band may have an electrical resistance in the range from 10 to 25 MOhm. The electrical resistance of bellows and edge band can be measured as usual with a resistance measuring device designed as a multimeter with current and voltage measurement. In this case, the resistance can be measured on the diagonal with the longest extension of bellows (in plan view) and edge band (in the view).

The at least one further edge strip is electrically conductively connected to the electrically conductive filter layer. By providing such a conductive edge band, a simple possibility for electrically conductive connection of an electronic unit to the bellows of the filter element is made possible.

The filter element can thus advantageously be a functional component of an electrical circuit, whereby a direct current flow from the filter element to an electronic unit is made possible.

In the filter element according to the invention, the at least one further edge strip is shaped in such a way that it forms a pocket open towards at least one side. A plate-shaped element, for example a blade, can be inserted into this pocket. Instead of a pocket, a tab could also be referred to if openings to two sides are present. In particular, the pocket may have a V-shaped opening. A plate-shaped element can then be inserted into the pocket in a particularly simple manner. By providing such a pocket, a simple possibility for mechanically connecting an electronic unit to the bellows is made possible. A plate-shaped element can thus be accommodated and held in the pocket in a form-fitting manner.

In further developments, the pocket can be divided and have a plurality of partial pockets. As a result, better form-fitting between the pocket and a plate-shaped element to be inserted can be realized.

It is particularly preferred if the pocket is open towards the inflow side, that is to say to the raw gas side of the bellows, or to the outflow side, to the clean-gas side of the bellows. Towards these sides, the pocket has its longest extension, so that a particularly simple insertion of a plate-shaped element is made possible. When installing and removing the filter element in a filter receptacle, a plate-shaped element can be held easily in the pocket.

Alternatively, the pocket could also be provided with a lateral opening so that the plate-shaped element can be inserted laterally, approximately at right angles to the flow direction.

In further developments of the filter element according to the invention, the at least one further edge strip is glued to the bellows. In particular, the adhesive bond can consist of an electrically conductive adhesive. The electrical connection between the at least one further edge strip and the electrically conductive filter layer is then effected by the electrically conductive adhesive. Electrical conductivity is understood as already stated above.

It has been found in tests that it is particularly advantageous if the at least one further edge strip consists of an electrically conductive nonwoven, in particular a polyester nonwoven, which is coated with an electrically conductive material.

Alternatively, the at least one further edge strip may consist of an at least two-layer filter medium having at least one particle filter layer and an electrically conductive filter layer.

In an advantageous embodiment of the filter element according to the invention, the electrically conductive filter layer is designed as an adsorption filter layer for gas adsorption and has in particular activated carbon and has a surface weight of 100 to 600 g/m$^2$ and a material thickness of 0.7 to 3.5 mm.

In an advantageous development of the filter element according to the invention, the bellows of the filter element has an indentation and the at least one further edge strip is fastened to the bellows in the region of the indentation and seals the bellows to the side. Indentation is understood here to mean a deviation of the shape of the shape of the bellows from the geometric basic shape. For example, a deviation from a particularly rectangular or trapezoidal basic shape. The plan view of the indentations can in particular have the shape of a triangle.

In other words: By means of the indentation, space is created directly adjacent to the bellows in which there is no filter medium and which can be filled by another unit, for example by an electronic unit which is assigned to the filter element. With such a filter element with indentation of the bellows, a particularly compact integration of an electronic unit into the filter assembly is made possible when the electronic unit is located in the volume of the indentation. Retrofitting with an electronic unit is thus also made possible without the dimensions of the filter channel accommodating the filter element having to be changed.

The invention also relates to a filter assembly having a filter element as described above and having an electronic unit, wherein the electronic unit has a plate-shaped blade made of electrically conductive material, for example a metal, which is shaped in a manner complementary to the pocket and is held in the pocket in a form-fitting manner. Thanks to this embodiment, the filter element is a functional component of an electrical circuit.

In an advantageous refinement of the filter assembly according to the invention, the bellows of the filter element has an indentation and the electronic unit is shaped in a manner complementary to the indentation and positioned in the indentation. In other words: The dimensions of the indentation and the dimensions of the electronic unit almost coincide, so that the volume of the indentation is occupied by the volume of the electronic unit.

In an advantageous refinement of the filter assembly according to the invention, the electronic unit is an ionization unit, a sensor unit or a temperature control unit.

The described invention and the described advantageous developments of the invention, even in combination with one another insofar as this is technically sensible, also constitute advantageous developments of the invention.

The filter assembly according to the invention can be used in particular as an interior air filter in vehicles, such as automobiles, trucks, trains, aircraft or ships.

The invention will now be explained in more detail using the accompanying figures. Corresponding elements and components are provided with the same reference symbols in the figures. For the sake of better clarity of the figures, a presentation that is true to scale has been dispensed with.

FIG. 1 shows a filter assembly 100 in a plan view. The filter assembly 100 has a filter element 10 and an electronic unit 20 arranged directly adjacent to each other. The electronic unit 20 is only indicated in the figure and is not shown in detail with all its elements. The filter element 10 has a bellows 1 made of a multiply folded filter medium 2. On two sides of the bellows 1, an edge band 3 is connected to the inside of the bellows 1 in a firmly bonded manner, specifically glued, namely in such a way that the respective edge band 3 rests against the end edges of folding surfaces of the bellows. In addition to these edge strips 3, which are also known from the prior art, a further, electrically conductive edge strip 4 is additionally provided, which is likewise firmly bonded to another outer side of the bellows 1, specifically glued, namely in such a way that the at least one further edge strip 4 likewise abuts the end edges of folding surfaces of the bellows 1. The bellows 1 has an indentation 9 in the form of a triangle, specifically a region which represents a deviation from the rectangular basic shape of the outer edges of the bellows 1. In the volume which is formed by the indentation 9, the electronic unit 20 is accommodated.

Figure 4:
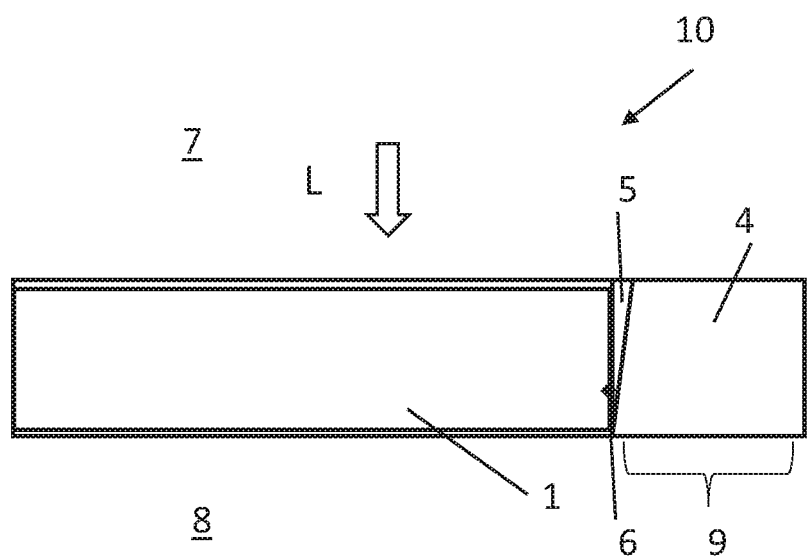
FIG. 4 shows a view of the filter element.

A sectional view through the filter element 10 at the location indicated by a dashed line in FIG. 1 is shown in FIG. 4.

Figure 2:
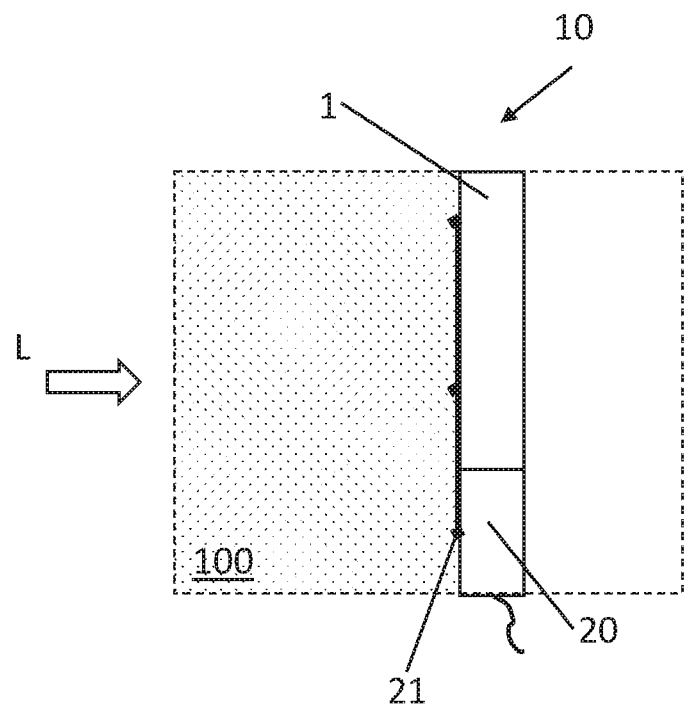
FIG. 2 shows a sectional view of a first embodiment of a filter assembly according to invention.

FIG. 2 shows the filter assembly 100 in a lateral view. The electronic unit 20 is embodied as an ionization unit and has an ionization electrode 21 which is arranged on the raw gas side of the filter element 10 for ionizing an air flow to be cleaned L. The deposition electrode of the ionization unit is formed by the electrically conductive electrically conductive filter layer 2.2 of the bellows 1; a separate deposition electrode is not required. A particularly compact construction of the filter assembly 100 with ionization unit 20 is therefore realized.

Figure 3:
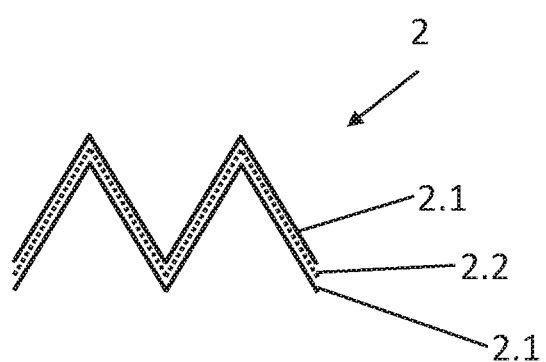
FIG. 3 shows a section through a filtering medium.

The structure of the filter medium 2 forming the bellows 1 is shown in FIG. 3. The filter medium 2 has a plurality of layers, specifically a particle filter layer 2.1, an electrically conductive filter layer 2.2 and a further particle filter layer 2.1, wherein the electrically conductive filter layer 2.2 is located between the particle filter layers 2.1 and is thus protected by the latter. The electrically conductive filter layer 2.2 is designed, for example, as an adsorption filter layer and has, for example, activated carbon, so that it is suitable for gas adsorption.

FIG. 4 shows a sectional view through the filter element 10 at the point indicated by a dashed line in FIG. 1. The bellows 1 of the filter element 10 is traversed by an air flow L from the inflow side 7 (raw gas side) to the outflow side 8 (clean gas side) and is thereby filtered. The further, electrically conductive edge strip 4 is connected to the bellows 1 by an adhesive bond 6. The adhesive bond 6 can be realized by an electrically conductive adhesive. The further, electrically conductive edge band 4 forms a pocket 5 which here is of V-shaped design and is open towards the inflow side 7. A plate-shaped blade 22 can be inserted into the electronic unit 20 through the opening of the pocket 5 in order to connect the electronic unit 20 to the filter element 10 in an electrically conductive manner.

Figure 5:
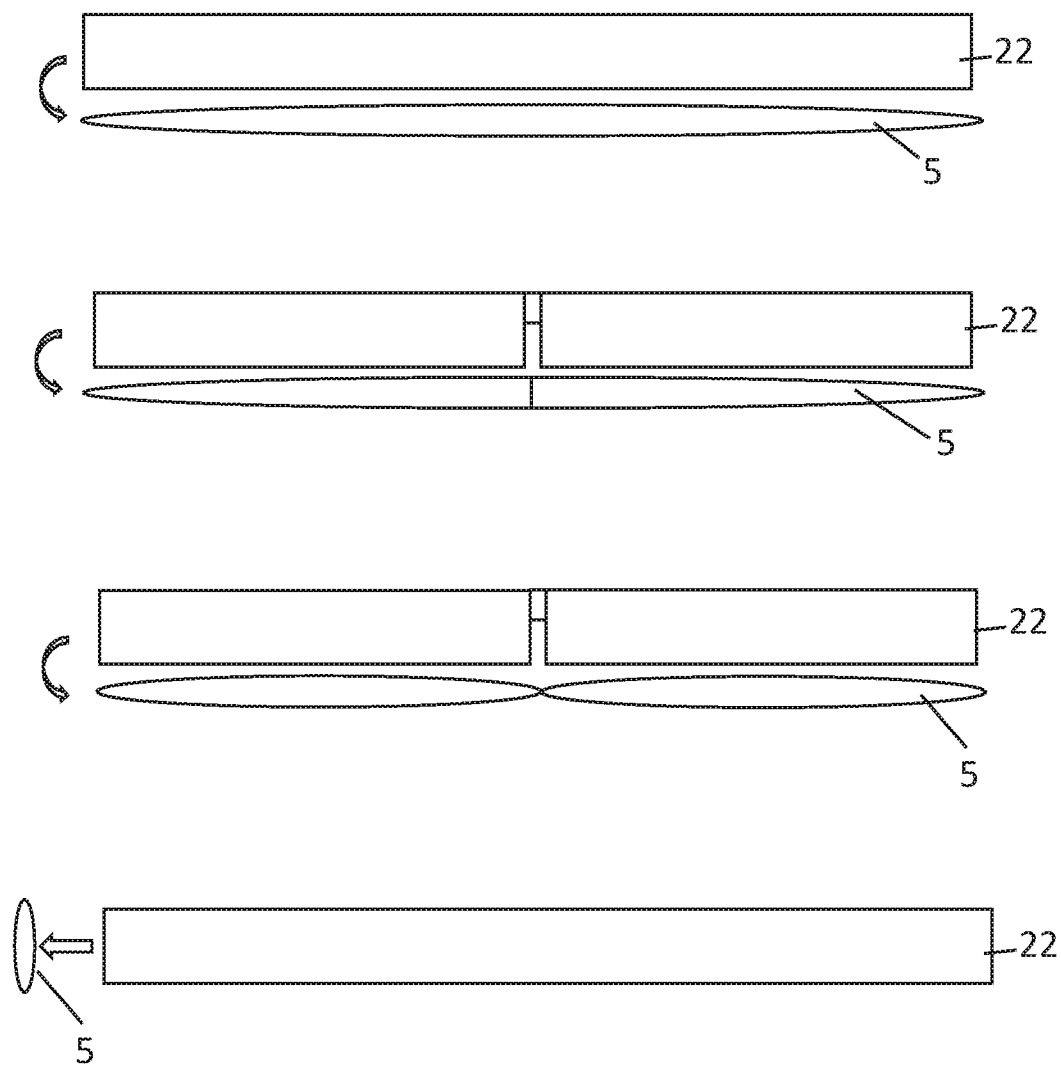
FIG. 5 shows four different embodiments of pockets and blades formed in a complementary manner with respect to one another.

Possible embodiments of the pocket 5 are shown in the various variants of FIG. 5. A pocket 5 having an opening is provided for the uppermost variant. In the second variant, the pocket 5 has an approximately centrally arranged separating web and thus two pockets. In the third variant, the pocket 5 is formed by two separate partial pockets. However, it is also conceivable for a given number of partial pockets to be formed. While FIG. 5 in the various variants show the pockets 5 in each case in a plan view, the associated blades 22 are each shown in a view. The arrows indicate that a respective blade 22 can be inserted into a respective pocket 5. The blades 22 each have a shape which is complementary to the shape of the pockets 5. This ensures that the blades 22 can be both inserted simply into the pockets 5 and held easily in the pockets 5.

Alternatively, in the case of the lowermost variant, the pocket 5 can also be provided with a lateral opening so that the blade 22 can be inserted laterally.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

LIST OF REFERENCE SIGNS

1 Bellows
2 Filter medium
2.1 Particle filter layer
2.2 Electrically conductive filter layer, e.g. adsorption filter layer
3 Edge band
4 Further electrically conductive edge strip
5 Pocket
6 Adhesive bond
7 Inflow side (raw gas side)
8 Outflow side (clean-gas side)
9 Indentation
10 Filter element
20 Electronic unit
21 Ionizing electrode
22 Blade
100 Filter assembly
L Air stream

What is claimed is:

1. A filter element for filtration of an air stream, comprising:
a folded filter medium forming a bellows, the filter medium being constructed at least in two layers and having a particle filter layer, an electrically conductive filter layer, and at least one edge band, the at least one edge band being connected to at least one outer side of the bellows,
wherein at least one further edge band is connected to another outer side of the bellows,
wherein the at least one further edge band is electrically conductive,
wherein the at least one further edge band forms a pocket open towards one side, and
wherein the pocket is open in a direction of an inflow side or an outflow side of the bellows.

2. The filter element according to claim 1, wherein the pocket is divided and has a plurality of partial pockets.

3. The filter element according to claim 1, wherein the at least one further edge band is glued to the bellows with an adhesive bond.

4. The filter element according to claim 3, wherein the adhesive bond comprises an electrically conductive adhesive.

5. The filter element according to claim 1, wherein the at least one further edge band comprises an electrically conductive nonwoven fabric comprising a synthetic polymer.

6. The filter element according to claim 1, wherein the at least one further edge band comprises an at least two-layer filter medium having a particle filter layer and an electrically conductive filter layer.

7. The filter element according to claim 1, wherein the electrically conductive filter layer comprises an adsorption filter layer for gas adsorption.

8. The filter element according to claim 7, wherein the adsorption filter layer comprises activated carbon.

9. The filter element according to claim 1, wherein the bellows has an indentation and the at least one further edge band is fastened to the bellows in a region of the indentation and seals the bellows.

10. A filter assembly, comprising:
a filter element for filtration of an air stream, comprising:
a folded filter medium forming a bellows, the filter medium being constructed at least in two layers and having a particle filter layer, an electrically conductive filter layer, and at least one edge band, the at least one edge band being connected to at least one outer side of the bellows, wherein at least one further edge band is connected to another outer side of the bellows, wherein the at least one further edge band is electrically conductive, and wherein the at least one further edge band forms a pocket open towards one side; and
an electronic unit,
wherein the electronic unit has a blade comprising electrically conductive material which is formed in a manner complementary to the pocket and is held in the pocket in a form-fitting manner.

11. The filter assembly according to claim 10, wherein the bellows has an indentation and the at least one further edge band is fastened to the bellows in a region of the indentation and seals the bellows, and
wherein the electronic unit is shaped in a manner complementary to the indentation and positioned in the indentation.

12. The filter assembly according to claim 10, wherein the electronic unit comprises an ionization unit, a sensor unit, or a temperature control unit.

\* \* \* \* \*